July 26, 1949.  C. E. TACK  2,477,500
ROTOR
Filed Nov. 5, 1943  2 Sheets-Sheet 1
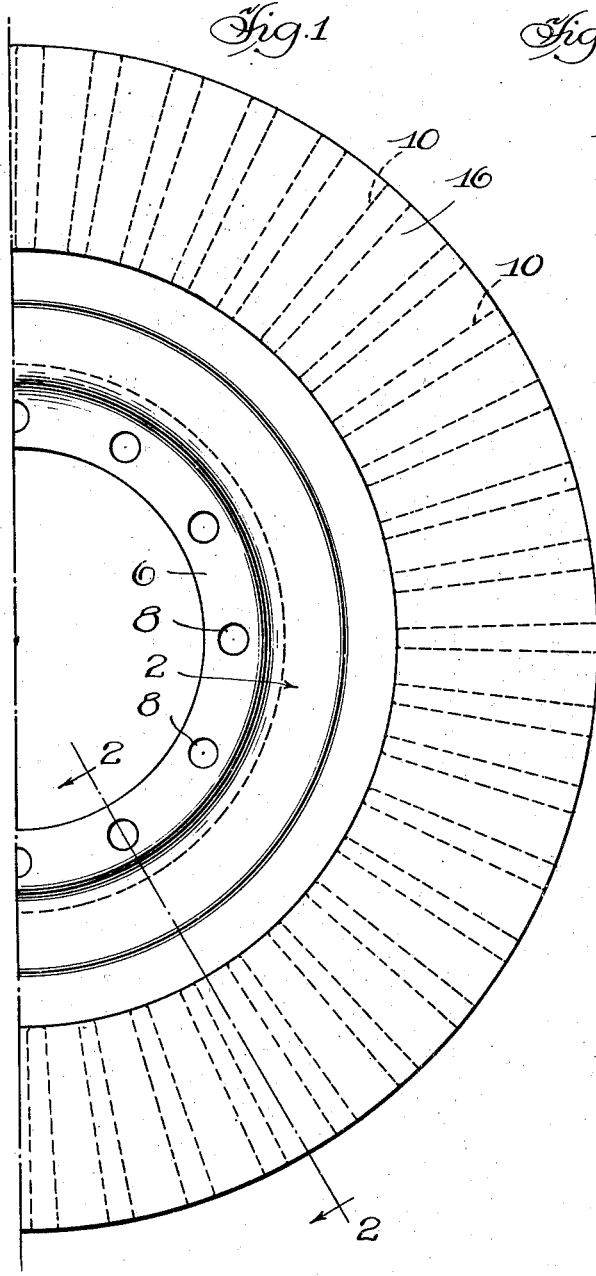
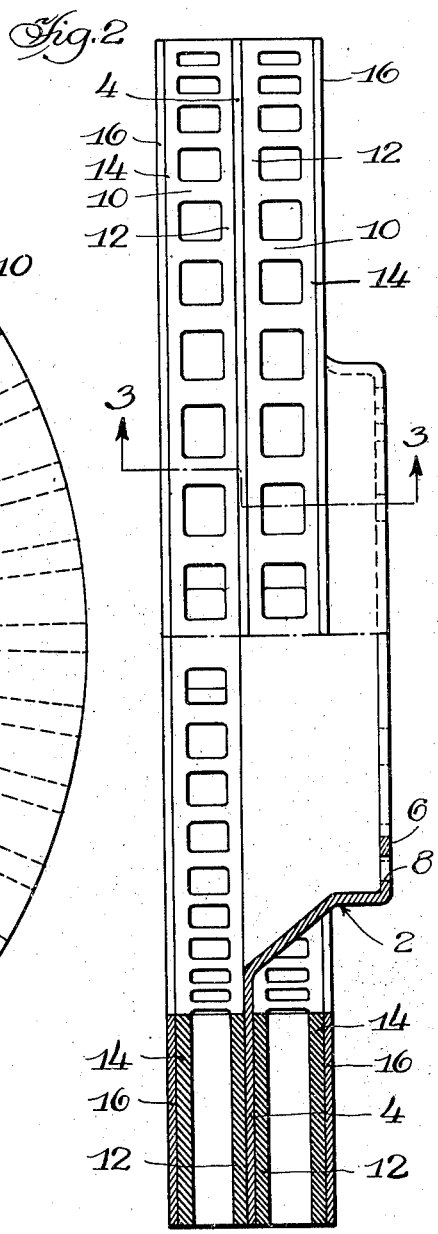
INVENTOR.
Carl E. Tack
BY July 26, 1949.　　　　　C. E. TACK　　　　　2,477,500
ROTOR Filed Nov. 5, 1943　　　　　　　　　　　　　2 Sheets-Sheet 2

INVENTOR.
Carl E. Tack
BY
Orin O. B. Garner
Atty.

Patented July 26, 1949

2,477,500

UNITED STATES PATENT OFFICE 2,477,500

ROTOR

Carl E. Tack, Chicago, Ill., assignor to American Steel Foundries, Chicago, Ill., a corporation of New Jersey Application November 5, 1943, Serial No. 509,031

14 Claims. (Cl. 188—218)

My invention relates to brake equipment and more particularly to a brake disc or rotor which may be attached to an associated rotating element for cooperation with brake means for decelerating said element.

An object of my invention is to design a brake disc comprising a support structure formed partially of aluminum or other metal having the characteristic of relatively great heat conductivity. Friction members of iron or steel are bonded to the support structure to afford suitable friction surfaces for engagement with associated friction means such as, for example, brake shoes.

Another object of my invention is to design a brake disc in which the friction surfaces thereof are formed partially of material having relatively great heat conductivity and partially of material more suitable for a braking surface but having relatively low heat conductivity.

A specific object of my invention is to design a fabricated brake rotor of the centrifugal or peripheral type adapted to circulate a cooling medium such as air during rotation of the disc. The novel rotor disclosed herein is of the generic type illustrated and described in my co-pending application, Serial No. 409,999, filed September 8, 1941, now United States Patent Number 2,350,970.

My novel rotor is especially designed for circulating air. However, it will be understood that it may be utilized in any suitable medium such as, for example, oil. The rotor comprises a support structure including a hub member formed of iron or steel and spaced rings at opposite sides of said hub member and connected thereto by means of blower blades bonded to said hub member. The blades and the rings are formed of aluminum or some similar metal having the characteristic of high heat conductivity and bonded to said rings are a pair of annular friction plates composed of iron or steel and presenting friction surfaces for engagement with associated friction means such as brake shoes.

In the drawings, Figure 1 is a side elevation of one embodiment of my novel rotor, only one half of the rotor being illustrated, inasmuch as it is a symmetrical annular member.

Figure 2 is a composite view taken from the right as seen in Figure 1, the upper half of Figure 2 being an edge elevation and the lower half hereof being a sectional view taken in the radial plane indicated by the line 2—2 of Figure 1.

Figure 3:
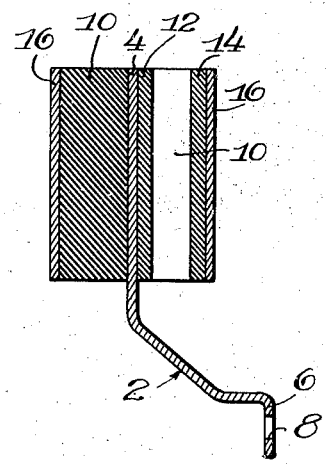
Figure 3 is a sectional view taken in the radial plane indicated by the line 3—3 of Figure 2.

Describing my invention in detail and referring first to the embodiment thereof illustrated in Figures 1–3 inclusive, my novel brake disc or rotor comprises a somewhat bell-shaped support or hub member 2 formed at its outer perimeter with a plate portion 4, and at its inner perimeter with an inturned flange 6 having the spaced openings 8, 8 therethrough for the reception of means affording securement for the rotor to an associated rotating element such as, for example, a wheel of a railway car truck. The support member 2 is formed of iron or steel or some similar material of considerable strength.

At opposite sides of the plate portion 4 of the support member 2 are heat-radiating fins or blower blades 10, 10, the blades at each side of the portion 4 merging with spaced rings 12 and 14. The rings 12, 12 are bonded to the plate portion 4 and the rings 14, 14 are bonded to the annular friction plates 16, 16 formed of iron or steel or similar material affording a suitable friction surface for engagement with associated brake shoes. The rings 12, 12 and 14, 14, as well as the blades 10, 10, are formed of aluminum or similar material having the characteristics of high heat conductivity. Thus it will be understood that heat generated in the plates 16, 16, during a braking application, will be rapidly conducted away from these plates to the support member 2 and thence to the rotating element to which the rotor is attached.

It may be noted that the blades 10, 10 function as columns to resist braking pressure applied to the friction plates 16, 16 and, likewise, the blades 10, 10 function as blower elements to impel air or other fluid radially outwardly from the outer periphery of the rotor during actuation thereof. The rotor illustrated in Figures 1 to 3 inclusive is fabricated by placing the support member 2 and the friction plates 16, 16 in a mold, and casting the aluminum blades 10, 10 and the associated rings 12 and 14 against the plate portion 4 and the plates 16, 16, which are coated with a suitable flux affording a bond between the iron and aluminum.

Figure 5:
Figures 4 and 5 illustrate a modification of my invention, Figure 4 being a sectional view comparable to Figure 3, and Figure 5 being a fragmentary side elevation comparable to Figure 1.
Figure 4:
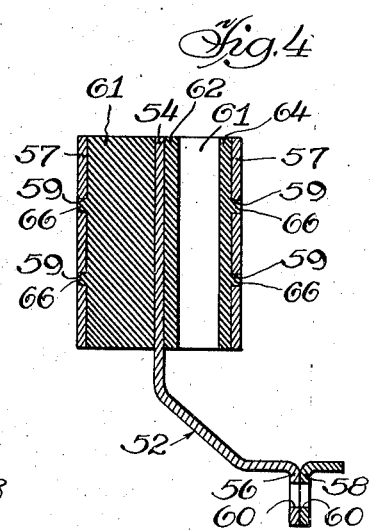

Referring now to Figures 4 and 5 which illustrate a modification of my novel rotor, the support member 52 is substantially identical with that described for the previous embodiment and comprises at its outer perimeter the plate portion 54 and at its inner perimeter the inturned flange 56 reinforced by the annular plate 58, said flange and said plate being provided with aligned openings 60, 60 for the reception of means securing the rotor to an associated rotating element.

At opposite sides of the plate portion 54 of the support member 52 are the annular friction plates 57, 57 formed with annular concentric slots 59, 59. As in the previous embodiment of my invention, blades 61, 61 are secured to the plate portion 54 and the respective friction plates 57, 57 by means of the rings 62 and 64, said rings and the blades 61, 61 being composed of aluminum which is cast onto the plate portion 54 and the friction plates 57, 57 as in the previously described embodiment, the rings 64 being provided with annular projections 66, 66 received within the slots 59, 59 and affording friction surfaces substantially co-planar with the friction surfaces of the plates 57, 57.

It will be understood that by means of the arrangement illustrated in Figures 4 and 5 the aluminum projections 66, 66 directly engage the brake shoes and transmit heat therefrom to the plate portion 54 of the support member 52.

Figure 7:
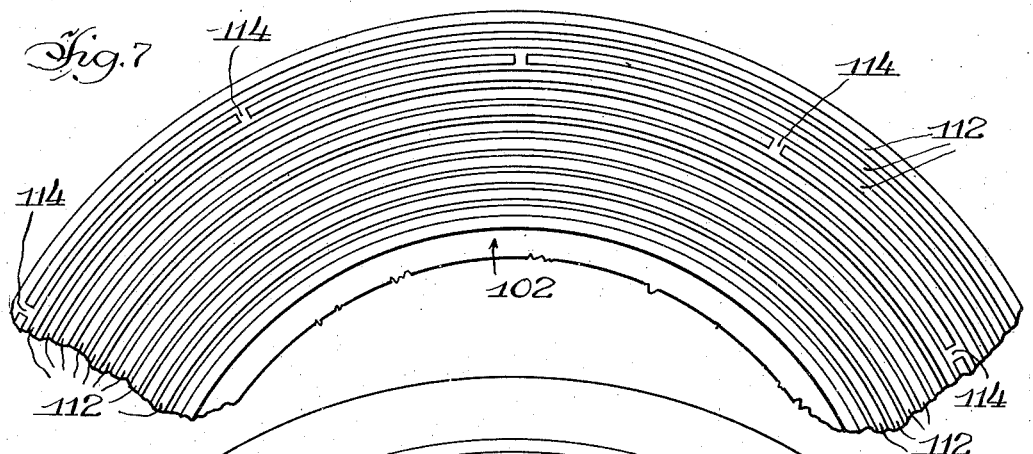
Figures 6 and 7 illustrate another modification of my invention, Figure 6 being a sectional view comparable to Figure 3, and Figure 7 being a fragmentary side elevation comparable to Figure 1.
Figure 6:
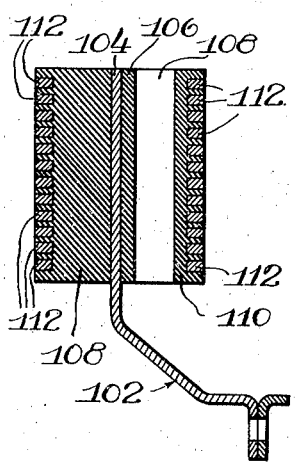

Still another modification of my invention is illustrated in Figures 6 and 7 wherein the support member 102 is substantially identical with that described for the previous embodiments of my invention and comprises the plate portion 104 bonded at each side thereof to a ring 106, said ring being integral with the blades 108, 108 which merge with the ring 110, having imbedded therein a plurality of friction rings 112, 112. Each of the rings 112, 112 is interrupted by a slot 114 for the purpose of facilitating expansion and contraction of rings 112, 112 as the rotor is alternately heated and cooled under service conditions. As will be noted in Figure 7, the slots 114, 114 in the respective rings 112, 112 are staggered or in radial misalignment to prevent concentration of stresses, as will be understood by those skilled in the art. Each slot 114 is spaced approximately 30 degrees from the adjacent slot.

It will be understood that the rings 112, 112 and the support member 102 are of iron or steel and the blades 108, 108 and the rings 106 and 110 are of aluminum, the rings 110, 110 and the rings 112, 112 at each side of the plate portion 104 presenting substantially co-planar braking surfaces for engagement with associated brake shoes.

It is to be understood that I do not wish to be limited by the exact embodiments of the device shown which are merely by way of illustration and not limitation as various and other forms of the device will, of course, be apparent to those skilled in the art without departing from the spirit of the invention or the scope of the claims.

I claim:

1. In a brake rotor, a support member comprising means affording securement to an associated rotating element, spaced rings at opposite sides of said support member, and blades between each ring and said support member and connected to the latter, each blade having spaced portions projecting through complementary openings in the adjacent ring for interlocking engagement therewith, each ring and the portions on the associated blades presenting co-planar friction surfaces adapted for engagement with an associated brake member, said blades being composed of material having greater heat conductivity than said rings and said rings being formed of material more suitable for a friction surface.

2. In a fabricated brake rotor, a bell-shaped support member of ferrous metal having at its outer perimeter a plate portion and at its inner perimeter a flange for securement to an associated rotating member, an aluminum structure at each side of said portion and comprising a ring bonded thereto, a spaced ring, and integral blades extending between said rings, and a plurality of annular friction members of ferrous metal bonded to said spaced ring, and presenting friction surfaces co-planar with friction means thereon, each of said friction members being interrupted by a slot, the slots in respective friction members being in radial misalignment.

3. In a brake rotor, spaced rings, a support member therebetween, blades connecting said rings to said member, and annular friction members bonded to said rings, said rings and blades being composed of metal having the characteristic of great heat conductivity, and said support and friction members being composed of metal having relatively great strength and relatively low heat conductivity in comparison with that of said blades and rings, each friction member and the associated ring presenting substantially co-planar friction surfaces for engagement with associated friction elements.

4. In a brake rotor, a support member comprising means affording securement to an associated rotating member, spaced rings at opposite sides of said support member, integral blades joining said rings and bonded to said support member, and a plurality of annular friction elements imbedded in each ring and presenting co-planar friction surfaces therewith, and slots through said elements interrupting the same, the slots in respective elements associated with each ring being in radial misalignment.

5. In a fabricated brake rotor, a bell-shaped support member of ferrous metal having at its outer perimeter a plate portion and at its inner perimeter a flange for securement to an associated rotating member, an aluminum structure at each side of said portion and comprising a ring bonded thereto, a spaced ring, and integral blades extending between said rings, and a plurality of annular friction members of ferrous metal bonded to said spaced ring, and presenting friction surfaces co-planar with friction means thereon, each of said friction members being interrupted by a slot.

6. In a brake rotor, a support member, spaced annular friction plates at opposite sides thereof, and a structure connecting said plates with said member, said structure comprising columns extending between and bonded to said plates and said member, and said structure being formed of material having greater heat conductivity than said plates and said member, portions of said structure presenting co-planar friction surfaces with friction surfaces on the remote surfaces of said plates.

7. In a brake rotor, a support member, spaced rings at opposite sides thereof, blades integral with said rings and bonded to said member, said blades and rings being composed of material having the characteristic of relatively high conductivity of heat, and a plurality of friction elements imbedded in each ring and presenting co-planar friction surfaces therewith, said friction elements and said support member being formed of material having relatively great strength and relatively low conductivity of heat in comparison to the material composing said rings and blades.

8. In a fabricated brake rotor, a bell-shaped support member of ferrous metal having at its outer perimeter a plate portion and at its inner perimeter a flange for securement to an associated rotating member, an aluminum structure at each side of said portion and comprising a ring bonded thereto, a spaced ring and integral blades extending between said rings, and an annular friction plate of ferrous metal bonded to said spaced ring, and presenting a friction surface co-planar with a friction surface thereon.

9. In a fabricated brake rotor, a bell-shaped support member of ferrous metal having at its outer perimeter a plate portion and at its inner perimeter a flange for securement to an associated rotating member, an aluminum structure at each side of said portion and comprising a ring bonded thereto, a spaced ring, and integral blades extending between said rings, and a plurality of annular friction members of ferrous metal bonded to said spaced ring, and presenting friction surfaces co-planar with friction means thereon.

10. In a brake rotor, a support member comprising means affording securement to an associated rotating member, spaced rings at opposite sides of said support member, integral blades joining said rings and bonded to said support member, and a plurality of annular friction elements imbedded in each ring and presenting co-planar friction surfaces therewith, and slots through said elements interrupting the same.

11. In a fabricated brake rotor, a bell-shaped support member of ferrous metal having at its outer perimeter a plate portion and at its inner perimeter a flange for securement to an associated rotating member, an aluminum structure at each side of said portion and comprising a ring bonded thereto, a spaced ring, and integral blades extending between said rings, and an annular friction plate of ferrous metal bonded to said spaced ring.

12. In a fabricated brake rotor, a bell-shaped support member of ferrous metal having at its outer perimeter a plate portion and at its inner perimeter a flange for securement to an associated rotating member, an aluminum structure at each side of said portion and comprising a ring bonded thereto, a spaced ring, and integral blades extending between said rings, and a plurality of annular friction members of ferrous metal bonded to said spaced ring.

13. In a brake rotor, a support member comprising means affording securement to an associated rotating member, spaced rings at opposite sides of said support member, integral blades joining said rings and bonded to said support member, and a plurality of friction elements imbedded in each ring and presenting co-planar friction surfaces therewith.

14. In a brake rotor, a support member comprising means affording securement to an associated rotating member, spaced rings at opposite sides of said support member, integral blades joining said rings and bonded to said support member, and a plurality of annular friction elements imbedded in each ring and presenting co-planar friction surfaces therewith.

CARL E. TACK.

REFERENCES CITED

The following references are of record in the file of this patent:

UNITED STATES PATENTS

| Number | Name | Date |
|---|---|---|
| 490,702 | Whitcomb | Jan. 31, 1893 |
| 953,308 | Waite | Mar. 29, 1910 |
| 1,168,810 | Jones | Jan. 18, 1916 |
| 2,255,024 | Eksergian | Sept. 2, 1941 |
| 2,288,438 | Dach | June 30, 1942 |